June 13, 1944.                 R. ULLMAN ET AL                      2,351,374
                              INSTRUMENT CASING
                              Filed Dec. 6, 1939
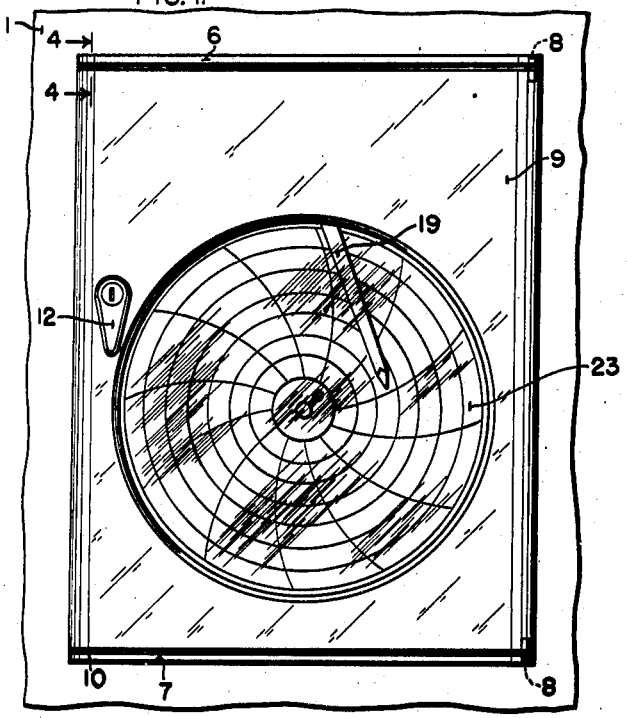
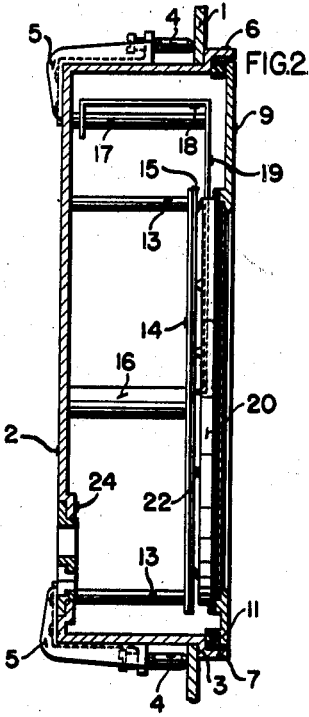
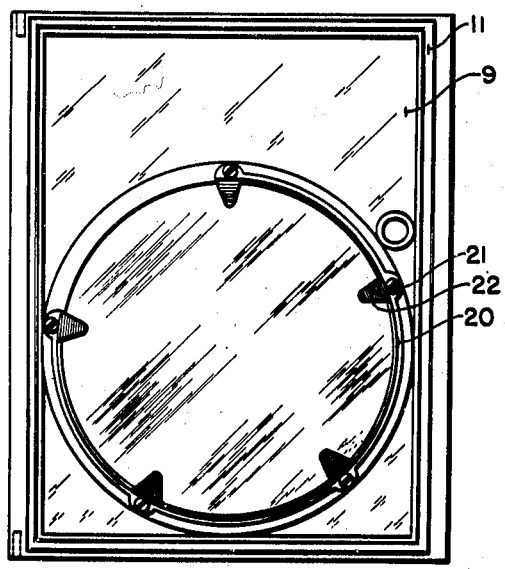
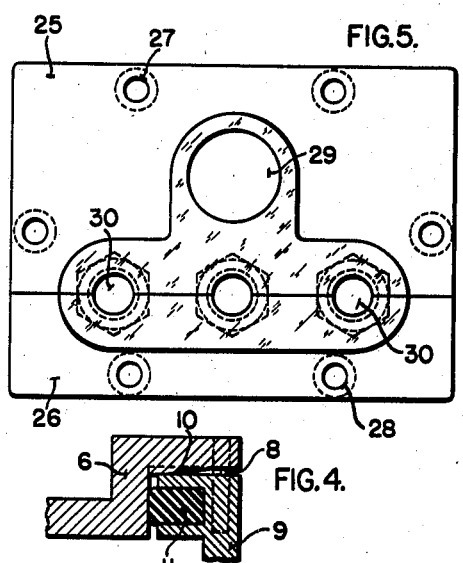
INVENTOR
COLEMAN B. MOORE
ROY ULLMAN
BY George M. ~~~~~~~~
ATTORNEY Patented June 13, 1944

2,351,374

UNITED STATES PATENT OFFICE 2,351,374

INSTRUMENT CASING

Roy Ullman, Roslyn, and Coleman B. Moore, Carroll Park, Pa., assignors to The Brown Instrument Company, Philadelphia, Pa., a corporation of Pennsylvania Application December 6, 1939, Serial No. 307,822

1 Claim. (Cl. 73—151)

The present invention relates to an instrument casing and is more particularly concerned with providing an instrument casing in which the door may be tightly closed and in which the mechanism within the casing is protected from dust falling into the casing as the door is opened.

In previous casings in which the mechanism of a measuring and recording instrument have been located, a great deal of trouble has been caused by the fact that as the door is opened the dust which has collected on the top ledge of the door and on the top of the casing will drop down and fall into the casing causing inaccuracies in the measuring mechanism due to the dirt. It is an object of our invention to overcome this defect in the present casing by providing a dust ledge which completely covers the door when it is in closed position. Therefore, as the door is opened no dust will be disturbed because none is on top of the door itself.

A further object of our invention is to provide an instrument casing in which there are no outstanding projections of any kind except that formed by the handle which is necessary to provide a means for opening the door. This is a decided advantage since previous to this the instrument has often been severely shaken and in some cases dislodged from its support by the accidental catching of some object against some projection on the casing as the object is being moved past the instrument.

It is a further object of our invention to provide an instrument casing in which the measuring mechanism located therein is completely hidden from view when the door is closed.

It is a further object of our invention to provide an improved means for supporting an instrument in an opening of a panel board such as is used in large installations of measuring and control instruments where the instruments are "flush mounted."

The various features of novelty which characterize our invention are pointed out with particularity in the claim annexed to and forming a part of this specification. For a better understanding of the invention, however, its advantages and specific objects obtained with its use, reference should be had to the accompanying drawing and descriptive matter in which we have illustrated and described a preferred embodiment of the invention.

In the drawing:

Fig. 1 is a front view of the instrument with the door closed;

Fig. 2 is a sectional view through the instrument;

Fig. 3 is an inside view of the door;

Fig. 4 is an enlarged sectional view showing the manner in which the door cooperates with the casing taken on line 4—4 of Fig. 1; and Fig. 5 is an enlarged view of the adaptor blocks.

Referring first to Fig. 1, there is shown a panel 1 through an opening in which an instrument casing 2 is placed. As is shown in Fig. 2 the open front of the casing 2 is provided with a flange 3 extending around its outer edge which flange is adapted to bear closely against the panel 1 and is held in that position by means of screws 4 which are threaded through brackets 5 that are attached to the back of the instrument casing. It will be seen that as the screws 4 are forced toward the panel board the flange 3 will be pulled against its opposite side so that the casing is securely held in place. The brackets 5 are shown herein as being angularly shaped castings that are screwed to the back of the casing to hold them in firm relation thereto. If it is desired to mount the casing 2 on the front of a board or on a wall instead of in the manner shown herein it is only necessary to substitute some kind of hanging bracket for the brackets 5.

Pivoted to the front of the casing 2 is a door 9 which serves to normally keep the casing closed to prevent the access of any material that would harm the mechanism located therein. Often the instrument is placed in very dusty locations, such for example, as in a cement mill, and dust that has been accumulated on the top of the door will be disturbed and often fall into the casing when the door is opened. In order to obviate this undesirable feature of previous instrument cases we provide a ledge 6 extending from the top of flange 3 for an extent at least equal to the thickness of the door 9. The door, fitting below the ledge, will not have any dust accumulated above it to be disturbed as it is opened.

A ledge 7 extending from the bottom of the flange 3 cooperates with the ledge 6 to serve as supports through which hinge-pins 8 may be driven into the door to form its pivotal support. In this manner the door is rigidly supported at its top and at its bottom without the necessity of any projecting hinges which may serve to catch into any passing object. By the use of hinges of this type, the door is more easily aligned so that it may be closed smoothly and without catching. In order to facilitate the closing of the door and to take care of any misalignment due to some unforeseen circumstance or accident there is provided on the left side of each of the ledges 6 and 7 a small wedge shape projection 10 which serves to guide the door into place between the ledges. Around the edge of the door there is a slot in which is inserted a sealing strip 11 of some material such as rubber or artificial rubber which serves, when the door is closed, to insure the sealing of the casing against dust, undesirable fumes, etc. The door may be closed by any suitable closure device such as the one shown at 12 in Fig. 1. This device may be provided with a lock if desired.

Within the casing may be located any desired or necessary measuring or control mechanism as well as a recording mechanism to record the value of the condition being measured on a chart provided therein. As is diagrammatically shown in Fig. 2, posts 13 extend from the back of the casing to support a chart plate 14 in front of which is placed a chart 15 that is supported and rotated by a shaft 16 which may be driven in any suitable manner. Above the chart is a shaft 17 upon which is a yoke 18, supporting a pen arm 19, which yoke is moved by any suitable type of measuring apparatus to move the pen across the face of the chart and make a record of the value of the condition thereon. Since the chart is a thin sheet of paper some means is necessary to hold this chart firmly against the backing plate 14 to prevent it from crumpling up and at the same time this holding means should be loose enough to permit the chart to be rotated freely by a clock mechanism. In order to accomplish this and at the same time provide a shield which will add to the appearance of the instrument there is provided a piece of sheet metal 20 generally of circular shape which is fastened to the door and extends between the door and the chart. This shield is provided with lugs 21 having openings through which screws are placed to fasten it to the inner face of the door. The shield is also provided with chart clips 22 on its inner face which clips bear lightly against the edges of the chart when the door is closed to hold the chart against the backing plate 14. The shield 20 is of such a size and so shaped that it substantially surrounds a window 23 in the door through which the pen and the chart may be seen. This shield serves to focus the attention of an observer on the chart and the pen and to cut off view of the measuring mechanism which may otherwise be seen between the edge of the chart and the door as well as to hold the chart in place.

In every instrument casing some means must be provided through which connections from the condition measuring element may be brought into the casing to the pen actuating and the controlling means. In this casing an opening 24 is provided from the back thereof so that such connections can be brought into the case. This opening is provided with an off-set edge as shown in Fig. 2 in which is inserted an adaptor block made up of two sections 25 and 26. Each of the sections of this block are provided near its edge with openings 27 through which screws may be put to securely fasten these parts to the back of the casing. The upper half of the block 25 is provided with an opening 29 through which some connections may be brought and it is also provided with semi-circular cut-out portions along the edge thereof which cooperate with similar portions in the block member 26. The openings 30 that are formed thereby permit connections to be passed from the outside of the casing to the inside. Each of these openings is suitably threaded so that they can be closed by suitable plugs if connections are not brought into the casing through them.

From the above detailed description it will be seen that we have provided an instrument casing that is pleasing in design as well as one which may be tightly closed against the entrance of dust and fumes from the outside. The casing is also provided with a ledge above the top of the door so that any dust which may have accumulated will not be disturbed and thrown into the casing when the door is opened.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claim, and that in some cases certain features of our invention may sometimes be used to advantage without a corresponding use of other features.

Having now described our invention, what we claim as new and desire to secure by Letters Patent is:

An instrument casing comprising a box-like structure having an open side, a flange extending around said casing adjacent said open side and adapted to abut against a support for the casing, horizontal ledges extending from the flange at the top and bottom of said opening, a door for said opening received within said ledges, means for pivotally mounting said door on said ledges, and wedge means formed on said ledges to guide said door into proper position as it is closed.

ROY ULLMAN.
COLEMAN B. MOORE.